United States Patent Office 2,874,068
Patented Feb. 17, 1959

2,874,068

PROCESS FOR LACQUERING RUBBER ARTICLES

Franz von Spulak, Leverkusen-Bayerwerk, Germany, assignor to Farbenfabriken Bayer Aktiengesellschaft, Leverkusen, Germany, a corporation of Germany No Drawing. Application May 18, 1955
Serial No. 509,381

Claims priority, application Germany November 30, 1948

7 Claims. (Cl. 117—72)

The present invention relates to an improvement in the production of lacquered rubber articles.

According to the present state of the art, linseed oil lacquers are primarily employed for lacquering rubber articles. These have to be applied to the rubber articles prior to vulcanisation, since they require a heat treatment (baking) for the purpose of hardening them. When this process is used, it is essential that the conditions for baking the lacquer layers and the vulcanisation of the rubber mixture be adapted to one another.

Other lacquers have also already been proposed for the production of lacquered rubber articles. However, it has been almost impossible to use these lacquers on a practical scale, since they are subject to extraordinarily high demands as regards elasticity and resistance to ageing for example.

In accordance with the present invention, lacquered surfaces of rubber articles are produced by initially treating those surfaces of the rubber article to be lacquered with a solution of a polyfunctional organic isocyanate and then, after the solvent has evaporated, with a solution of a hydroxyl polyester having an OH-number of 30–450 and an acid number of 0–40 whereupon the two components are caused to react with one another, if desired at elevated temperature. The two components, i. e. the polyfunctional organic isocyanates, on the one hand, and the hydroxyl polyesters, on the other hand, react with one another to form highly elastic lacquer coverings with excellent age-resisting properties and also excellent bonding strength to the support. The reaction is substantially independent of temperature, that is to say, the same result is produced if the operation is carried out at a normal temperature or at elevated temperature. In this manner, a product is made available to the rubber industry which is equally suitable for the lacquering of already vulcanised articles and for articles which still have to be vulcanised. In the case of articles which have not yet been vulcanised, the reaction leading to the formation of a lacquer from the said components is carried out under the conditions under which vulcanisation takes place.

Suitable isocyanates for the process of invention are, for instance, 1,2,4-toluylene diisocyanate, 1,2,6-toluylene diisocyanate and a technical mixture thereof, hexamethylene diisocyanate, 4,4′-diphenylmethane diisocyanate, 1,5-naphthylene diisocyanate, and preferably polyfunctional isocyanates having a low vapor pressure in order to avoid inconvenience to the operating personnel can be used, e. g. triphenylmethane triisocyanate and the condensation product of 1 mol trimethylol propane and toluylene diisocyanate. The term "hydroxyl polyester" covers polycondensation products obtained by thermal condensation at 150–220° of polybasic acids, such as adipic acid and phthalic acid, and polyfunctional alcohols, such as glycol, glycerine, hexanetriol or trimethylol propane. It is advantageous to use those polyesters synthesised solely from aliphatic components which have been produced by reacting polybasic acids with a mixture of dihydric and trihydric alcohols. Ethyl acetate, amyl acetate, acetone, cyclohexanone, methylene chloride and the mixture of methylene chloride and toluene are examples for suitable solvents.

The polyester solutions as such can be stored practically indefinitely. It is true that the solutions of the polyfunctional isocyanates cannot be stored indefinitely, but nevertheless they keep sufficiently long to ensure that they do not cause any deleterious effects in the lacquering of the rubber. The solutions can be applied in any suitable manner to the rubber articles to be lacquered, but the simplest way is to use a dipping process.

*Example 1.—Lacquering prior to vulcanisation*

An unvulcanised sheet or an unvulcanised overshoe consisting of a mixture having the following composition:

100.0 parts rubber sheets
 80.0 parts chalk
 10.0 parts carbon black
 10.0 parts zinc oxide
  1.2 parts mercaptobenzthiazole
  0.1 part tetramethyl thiuram disulphide
  0.2 part stearic acid
  2.0 parts sulphur
  0.8 part phenyl betanaphthylamine 204.3 was initially dipped in a 20% solution of triphenylmethane triisocyanate, i. e. in the ratio of 1:6, in dry methylene chloride and, after being stored for half an hour, was finally dipped in a solution of the following composition:

375 parts by weight of a polyester of 3 mols of adipic acid+1 mol of glycerine+3 mols of ethylene glycol
 42 parts by weight of a polyester of 13 mols of adipic acid+4 mols of glycerine
1500 parts by weight of toluene
3083 parts by weight of methylene chloride

5000

After an additional hour, the temperature was raised to 128° C. in hot air in 30 minutes, with an air pressure of 3 atmospheres, and kept under these conditions for 90 minutes.

*Example 2*

An unvulcanised sheet or an unvulcanised overshoe consisting of a mixture having the following composition:

100.0 parts rubber sheets
 80.0 parts chalk
 15.0 parts zinc oxide
  5.0 parts titan dioxide
 30.0 parts lithopone
  1.0 part mercaptobenzthiazole
  0.2 part tetramethyl thiuram disulphide
  1.5 parts stearic acid
  2.4 parts sulfur 235.1 was initially in a 20% methylene chloride solution of a reaction product of 1 mol of trimethylol propane and 3 mols of toluylene diisocyanate obtained by heating the components at 150° C. for two hours. After being stored for half an hour, the sheet was finally dipped in the polyester solution described in Example 1. After an additional hour the sheet was kept in hot air at 125° with an air pressure of 3 atmospheres for 30 minutes.

Example 3.—Lacquering after vulcanisation

A vulcanised sheet of the quality mentioned in Example 1 was initially dipped in a dilute solution of the above mentioned triisocyanate and finally dipped after half an hour in the solution metioned in Example 1. The lacquer dried at room temperature within 24 hours, but this time was reduced at elevated temperature, being for example 2 hours at a temperature of 70° C. It is possible for the lacquer to be dyed as desired.

What is claimed is:

1. A process for lacquering rubber which comprises initially treating the rubber with a solution of a polyfunctional isocyanate, evaporating the solvent from said solution, applying a solution of a hydroxyl polyester having an hydroxyl number of from about 30 to about 450 and an acid number of from zero to about 40 to said treated article and effecting a reaction between said isocyanate and said hydroxyl polyester.

2. A process as defined in claim 1, wherein a vulcanized rubber article is employed.

3. A process as defined in claim 1, wherein an unvulcanized rubber is employed and the product is subjected to vulcanization.

4. A process as defined in claim 1, wherein p,p',p''-triisocyanato-triphenylmethane is the isocyanate employed.

5. A process as defined in claim 1, wherein the reaction product of 1 mol of trimethylol propane and 3 mols of toluylene diisocyanate is the isocyanate employed.

6. In a method for lacquering rubber with a polyurethane, the improvement which comprises wetting the rubber first with a solution of a polyfunctional isocyanate, evaporating the solvent from the solution, applying a solution of an hydroxyl polyester having an OH number of from about 30 to about 450 and an acid number of from zero to about 40 on the resulting isocyanate coating and thereafter effecting chemical reaction between the isocyanate and polyester, thereby forming an elastic polyurethane coating on the rubber.

7. The product obtained by the process of claim 6.

References Cited in the file of this patent

UNITED STATES PATENTS

| 2,282,827 | Rothrock | May 12, 1942 |
| 2,430,479 | Pratt et al. | Nov. 11, 1947 |

FOREIGN PATENTS

| 573,932 | Great Britain | Dec. 13, 1945 |